(12) United States Patent
Chiloyan

(10) Patent No.: US 6,766,004 B1
(45) Date of Patent: Jul. 20, 2004

(54) METHOD AND APPARATUS FOR COORDINATING RINGING AND AUDIO ANNOUNCEMENTS IN A PHONE SYSTEM

(75) Inventor: John H. Chiloyan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/250,236

(22) Filed: Feb. 15, 1999

(51) Int. Cl.[7] .............................................. H04M 1/56
(52) U.S. Cl. ............. 379/142.15; 379/701; 379/106.09; 379/199; 455/415; 455/567
(58) Field of Search .................... 379/67.1, 88.19, 379/142.04, 142.15, 81, 82, 106.09; 455/415, 567, 465, 55

(56) References Cited

U.S. PATENT DOCUMENTS

| | | | | |
|---|---|---|---|---|
| 4,731,814 A | * | 3/1988 | Becker et al. | 455/411 |
| 4,928,306 A | * | 5/1990 | Biswas et al. | 379/201.05 |
| 5,191,607 A | * | 3/1993 | Meyers et al. | 379/421 |
| 5,363,430 A | * | 11/1994 | Yamagata et al. | 455/464 |
| 5,432,844 A | * | 7/1995 | Core et al. | 379/171 |
| 5,481,594 A | * | 1/1996 | Shen et al. | 379/88.19 |
| 5,812,951 A | * | 9/1998 | Ganesan et al. | 455/445 |
| 5,930,719 A | * | 7/1999 | Babitch et al. | 455/462 |
| 6,002,763 A | * | 12/1999 | Lester et al. | 379/421 |
| 6,148,213 A | * | 11/2000 | Bertocci et al. | 455/412 |

* cited by examiner

Primary Examiner—Fan Tsang
Assistant Examiner—Olisa Anwah
(74) Attorney, Agent, or Firm—Theodore M. Magee; Westman, Champlin & Kelly, P.A.

(57) ABSTRACT

A method and apparatus are provided that receive a caller identification packet from a central office. The caller identification packet is decoded to produce caller identification information, which is used to identify an audio message. Before presenting the audio message to the user, the method and apparatus disables ringing of the phone system. After the audio message has been presented to the user, ringing is re-enabled.

5 Claims, 10 Drawing Sheets

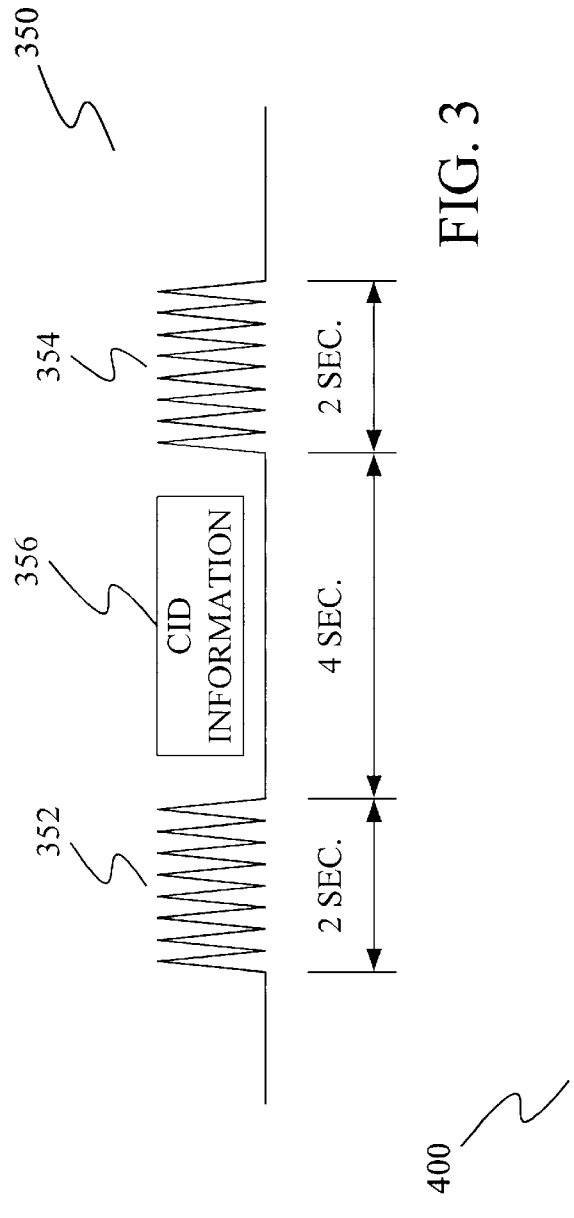

| PACKET INDEX | FIELD NAME | |
|---|---|---|
| 0X00 | PNUM & PID | |
| 0X01 | CID COMMAND | 422 |
| 0X02 | CID CHAR N | 424 |
| 0X03 | CID CHAR N+1 | 426 |
| 0X04 | CID CHAR N+2 | 428 |
| 0X05 | CID CHAR N+3 | 430 |
| 0X06 | CID CHAR N+4 | 432 |
| 0X07 | CID CHAR N+5 | 434 |
| 0X08 | CID CHAR N+6 | 436 |
| 0X09 | CID CHAR N+7 | 438 |
| 0X0A | CID CHAR N+8 | 440 |
| 0X0B | UNDEFINED | 442 |
| 0X0C | CHECKSUM | 444 |
| 0X0D | CHECKSUM | 446 |

| | PARAM TYPE | PARAMETER NAME | PARAMETER BYTES |
|---|---|---|---|
| 460 | <01> | DATE AND TIME | MMDDHHMM |
| 462 | <02> | CALLER NUMBER | UP TO 16 DIGITS |
| 464 | <03> | CALLER NUMBER (STATOR) | UP TO 16 DIGITS |
| 466 | <04> | REASON FOR NUMBER ABSENCE | "O"= OUT OF AREA "P"=PRIVATE |
| 468 | <05> | CALLER NAME | UP TO 15 CHARS |
| 470 | <06> | REASON FOR NAME ABSENCE | "O"= OUT OF AREA "P"=PRIVATE |

FIG. 6

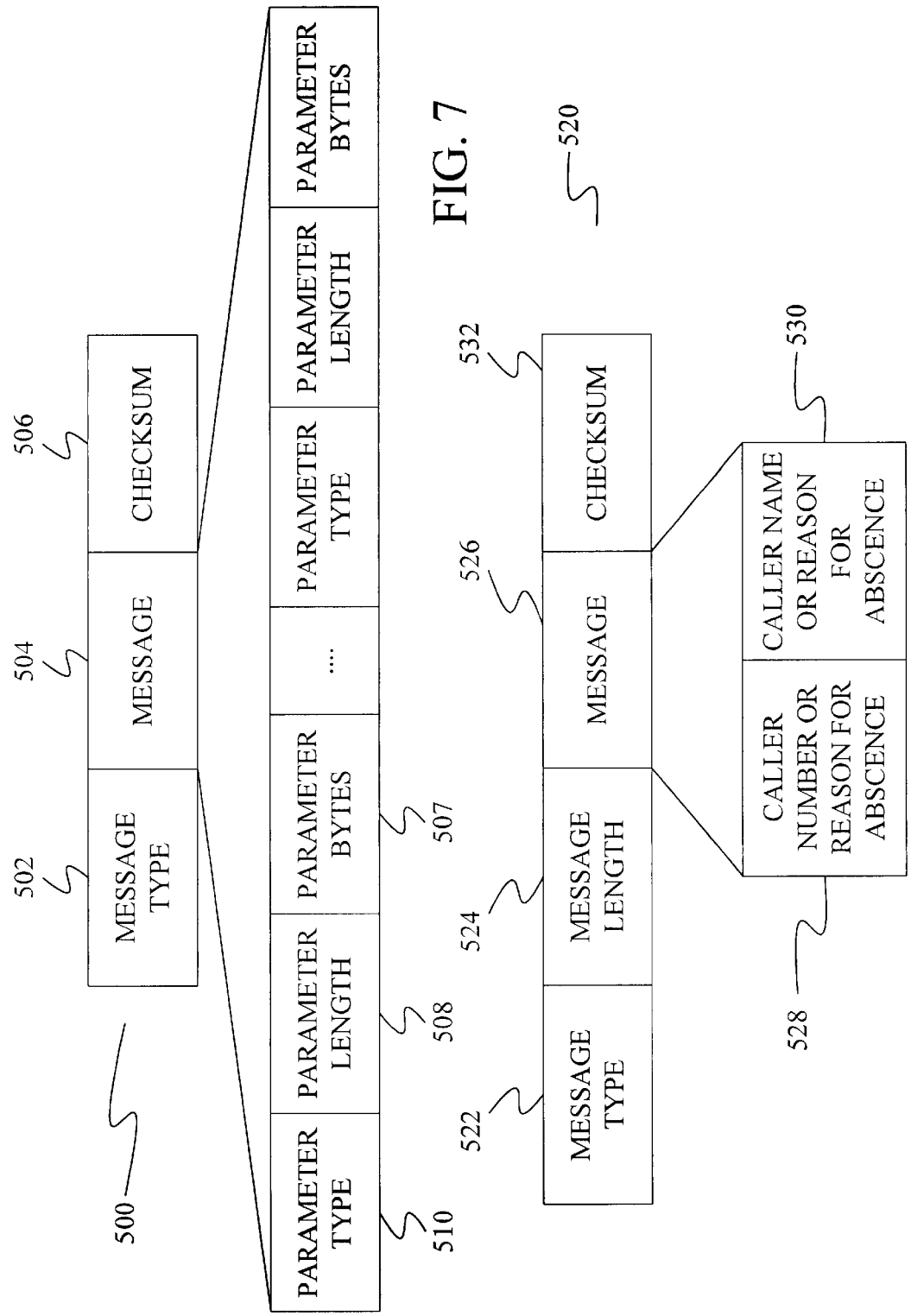

| PACKET INDEX | FIELD NAME |
|---|---|
| 0X00 | PNUM & PID |
| 0X01 | SYSTEM SETTINGS COMMAND |
| 0X02 | SETTINGS |
| 0X03 | RESERVED |
| 0X04 | RESERVED |
| 0X05 | RESERVED |
| 0X06 | RESERVED |
| 0X07 | RESERVED |
| 0X08 | RESERVED |
| 0X09 | RESERVED |
| 0X0A | RESERVED |
| 0X0B | RESERVED |
| 0X0C | CHECKSUM |
| 0X0D | CHECKSUM |

METHOD AND APPARATUS FOR COORDINATING RINGING AND AUDIO ANNOUNCEMENTS IN A PHONE SYSTEM

BACKGROUND OF THE INVENTION

The present invention relates to phone systems, and in particular relates to phone systems capable of providing caller information.

In recent years, work has been done to integrate phone systems with personal computers. Specifically, personal computers have recently been used to display and log caller identification (caller ID) information transmitted by the phone company's central office.

Although such caller id information is useful, the user is not always in front of their computer's display when a call arrives. In particular, if the user has a cordless phone, they may be some distance from their computer when they receive a call. Thus, in some instances, the user is not able to take advantage of the caller id information sent over the phone lines.

One possible solution is to provide an audio announcement of the caller's name. However, there are several difficulties with providing such audio announcements. In particular, any such announcements must be coordinated with the embedded ringing function found in cordless phone base stations and handsets so that the user will always receive some indication of an incoming call but will not be given an annoying or undesirable combination of audio signals.

SUMMARY OF THE INVENTION

A method and apparatus are provided that receive a caller identification packet from a central office. The caller identification packet is decoded to produce caller identification information, which is used to identify an audio message. Before presenting the audio message to the user, the method and apparatus disables ringing of the phone system. After the audio message has been presented to the user, ringing is re-enabled.

BRIEF DESCRIPTION OF THE DRAWINGS

FIG. 3 is a timing diagram for a ring signal from a central office.

FIG. 4 is a data structure for a data packet passed between a base station and a personal computer under the present invention.

FIG. 5 is a data structure for a caller identification packet under the present invention.

FIG. 6 is a table showing the relationships between parameter types and parameter bytes for caller identification information under the present invention.

FIG. 7 is a data structure showing the structure of caller identification information within the caller identification packet of FIG. 5.

FIG. 8 is a data structure showing an alternative layout for the caller identification information in the caller identification packet of FIG. 5.

FIG. 11 is a data structure for disabling ringing in the base station.

DETAILED DESCRIPTION OF ILLUSTRATIVE EMBODIMENTS

Under the present invention, a phone system uses a controller to disable ringing before emitting an audio announcement. By disabling ringing, the present invention insures that the announcement will not be obscured by the ringing of the phone. Under the invention, the announcement can include synthesized speech that states the caller's name or phone number. The announcement can also be based on stored audio files containing actual human speech or tones. In some embodiments of the invention, the controller re-enables ringing after the call is answered or after the caller terminates the call to ensure that the phone system will ring with the next incoming call.

Figure 1:
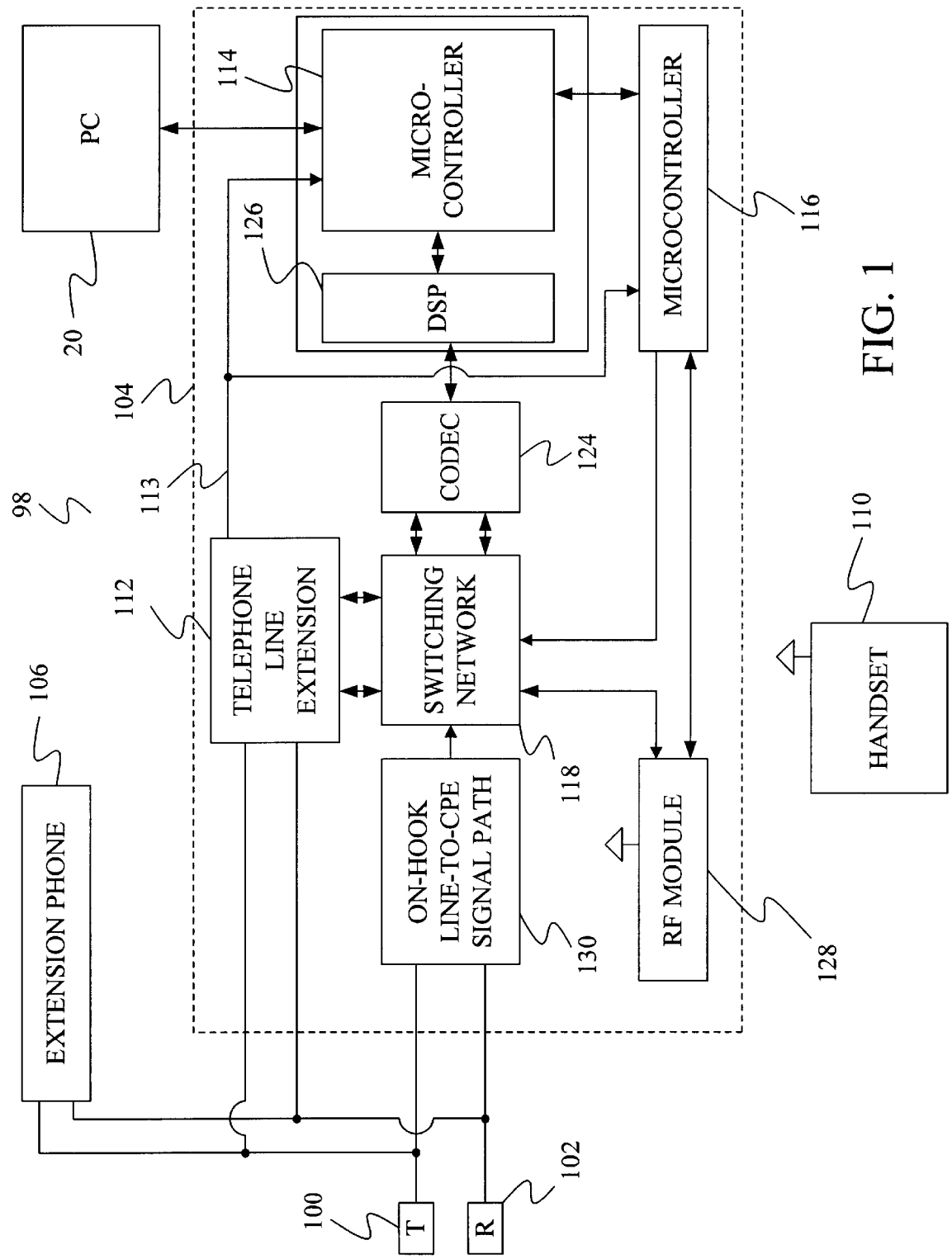
FIG. 1 is a block diagram of a phone system of the present invention.

FIG. 1 is a block diagram of a phone system 98 under the present invention that is connected to phone lines represented by tip line 100 and ring line 102. Tip line 100 and ring line 102 are connected to a central office (not shown) operated by a phone company. Within phone system 98, tip line 100 and ring line 102 are connected to a base station 104 and one or more extension phones 106. Additional telephone extensions, as well as fax machines, answering machines, and personal computers may be attached to tip line 100 and ring line 102 but are not shown in FIG. 1 for clarity.

Base station 104 is connected to a personal computer 20 and communicates with a handset 110 either through a cord attached between base station 104 and the handset or through radio waves transmitted between base station 104 and handset 110. In one embodiment, the radio waves have a frequency in the range of 900 megahertz. Base station 104 acts as an interface between personal computer 20, the phone lines of the central office, extension 106, and handset 110. Under this structure, personal computer 20, handset 110, and phone lines 100 and 102 can each be thought of as both an input device providing input to base station 104 and an output device receiving output from base station 104.

In its capacity as an interface between these input/output devices, base station 104 translates information provided by one of the input devices into a format acceptable for one of the output devices and routes the information to the appropriate output device. In addition, base station 104 generates original signals based on input signals that it receives.

Incoming calls on telephone lines 100 and 102 begin with a ring signal that includes a series of ring envelopes and in some cases embedded caller identification information. Based on the ring signal, base station 104 causes handset 110 to emit a ring tone. The process of detecting and transmitting a ring value to the handset is described below with reference to a flow diagram in FIG. 2 and the block diagram of FIG. 1. Note that FIG. 2 is a simplified view of the main processing loop and that many details obvious to those skilled in the art have been omitted for clarity.

Figure 2:
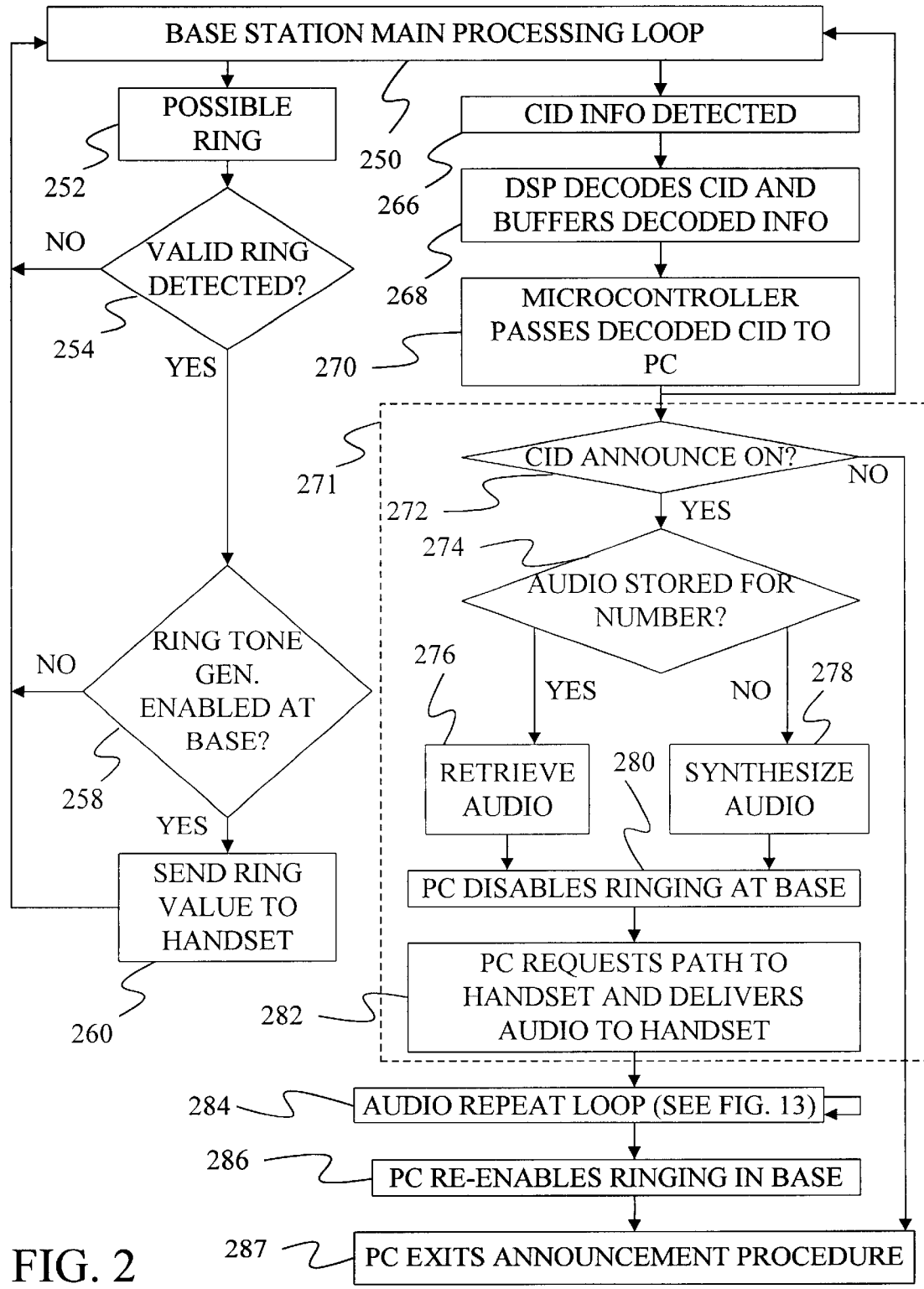
FIG. 2 is a flow diagram of a method under the present invention.

Before a ring signal is received by base station 104, the base station is in a main processing loop 250 of FIG. 2. At step 252 of FIG. 2 base station 104 receives a possible ring signal on telephone lines 100 and 102. This possible ring signal is received by telephone line interface 112 of base station 104, which examines the possible ring signal at a step 254 of FIG. 2 to determine if it is a valid ring signal.

FIG. 3 shows a signal diagram of a valid ring signal 350. Ring signal 350 includes two ring envelopes 352 and 354. Ring envelopes 352 and 354 are each two seconds long and consist of an alternating signal. In phone systems where caller identification information is sent from the central office, a caller identification packet 356 is positioned between ring envelopes 352 and 354 during a four-second separation between the ring envelopes. If caller identification information is not provided by the central office, the first two ring envelopes are separated by silence. Additional ring envelopes (not shown) are present in ring signal 350 after ring envelope 354. Each of these ring envelopes is two seconds long and is separated from its neighboring ring envelopes by four seconds. Note that the durations described above for the ring envelopes and the periods of silence are nominal and that variations in these time periods are expected and tolerated.

Telephone line interface 112 examines the first ring envelope, ring envelope 352 of ring signal 350, to determine if it has the proper voltage and frequency to possibly be considered a valid ring signal. If telephone line interface 112 determines that ring signal 350 may be a valid ring signal at step 254 of FIG. 2, telephone line interface 112 passes a digital ring detect envelope along a line 113 to microcontrollers 114 and 116 within base station 104. The digital ring detect envelope is a binary signal that has one value for the duration of a detected analog ring envelope and another value at all other times. Microcontrollers 114 and 116 measure the duration of the digital ring envelope at step 254 of FIG. 2 to ensure that the minimum duration of the envelope exists. If the envelope exists for a minimum amount of time, the ring signal is considered valid.

If a valid ring signal is detected at step 254, microcontroller 114 notifies personal computer 20 that a valid ring has been detected. At roughly the same time, microcontroller 116 examines a ring tone enable flag stored in a buffer associated with microcontroller 116. The status of the flag determines whether ring tone generation is enabled in base station 104 at the time the ring detect signal is received. This determination is shown as step 258 of FIG. 2. If ring tone generation is not enabled in base station 104 at step 258, control returns to the base station main processing loop 250 of FIG. 2.

If ring tone generation is enabled at step 258, microcontroller 116 passes a digital ring generation packet to a Radio Frequency (RF) module 128, which acts as a transmitter by transmitting the packet to handset 110 using radio frequency signals. In this context, microcontroller 116 acts as a ring generator.

Upon receiving the digital ring generation value, handset 110 examines its internal settings to determine if a do-not-disturb function is active on the handset. In one embodiment, the do-not-disturb function is activated by using a key on the handset and allows the user to turn off ringing at the handset so that the user is not disturbed. If the do-not-disturb function is active on handset 110, handset 110 does not emit a ring signal. If the do-not-disturb function is not active on handset 110, handset 110 retrieves a ring tone value and ring duration value from a stored memory location on handset 110 and uses these retrieved values to generate an audible ring signal.

After sending the first ring value to the handset, microcontroller 116 uses switching network 118 to connect line-to-cpe path 130 to CODEC 124 thereby establishing a communication path from the phone lines 100 and 102 to digital signal processor 126. In this configuration, caller identification information, if present, will pass through line-to-cpe path 130 and switching network 118, to CODEC 124. CODEC 124 converts the analog caller identification information in the packet into encoded digital values, which in one embodiment are encoded using the μLaw audio encoding scheme.

At step 266 of FIG. 2, digital signal processor 126 receives the encoded digital values from CODEC 124 and determines that they represent caller identification information. At step 268, digital signal processor 126 decodes the caller identification information and buffers the decoded information in a random access memory associated with microcontroller 116. Thus, CODEC 124 and digital signal processor 126 act together to form a caller identification decoder. At step 270 of FIG. 2, microcontroller 114 accesses the stored caller identification information and packages the information to transmit it to personal computer 20.

In one embodiment of the invention, microcontroller 114 uses a series of packets to convey the caller identification information to personal computer 20. A generic data packet for conveying such information is shown in FIG. 4 as data packet 400. Data packet 400 includes fourteen bytes, with the first byte containing a packet number nibble 412 and a data identification nibble 410. Data identification nibble contains a value that indicates that this packet contains command data instead of audio data. The next byte is a command identifier byte 408 that identifies the type of command data in the packet. After command identifier byte 408 are ten bytes of data, which are denoted as data payload 406. The last two bytes of the data packet are checksum bytes 402 and 404, which together form a sixteen-bit checksum value that contains the two's compliment of the sum of the other bytes in the data packet.

In one embodiment, personal computer 20 and microcontroller 114 use a series of handshaking data packets to ensure proper transmission of information. In particular, at the beginning of a transaction a header data packet is transmitted to indicate the start of a transaction. During the transaction, personal computer 20 sends a response data packet for each data packet it receives from microcontroller 114. The response data packet indicates if personal computer 20 successfully received the data packet. At the end of a transaction, microcontroller 114 sends a footer data packet to signify the end of the transaction.

FIG. 5 provides a data structure layout for a data packet 420, which is a specific example of data packet 400 of FIG. 4. Data packet 420 of FIG. 5 is used to communicate caller identification information from microcontroller 114 to personal computer 20. In one embodiment, the caller identification information is transmitted in five separate packets. Each packet has a different command name in command byte 422, which describes the number of the packet within the set of five packets. For example, in one embodiment, command name values of 1A, 1B, 1C, 1D, and 1E hexadecimal represent the first, second, third, fourth and fifth caller identification packets, respectively.

In data packet 420, bytes 424, 426, 428, 430, 432, 434, 436, 438, and 440, contain the caller identification information. These bytes represent the data payload of data packet 420. In one embodiment, byte 442 of data packet 420 is undefined and does not contain caller identification information. Bytes 444 and 446 of data packet 420 contain two portions of a checksum value for error checking of the transmitted data packet.

Currently, the central office transmits caller identification information in one of two formats. The first format is a multiple data message format and the second is a single data message format. In a multiple data message format, the central office sends multiple types of data with each type headed by a parameter-type value that identifies the type of data that follows. FIG. 6 is a table depicting a set of parameter-type values, their associated parameter names, and the layout of the data associated with each parameter type.

In row 460 of FIG. 6, the date and time of the call is associated with a parameter-type value of "01" and is transmitted as 4 bytes depicting the month "MM", the day "DD", the hour "HH" and the minute "mm" when the call was placed. The number associated with the caller is shown in row 462, and has a parameter-type value of "02". The caller's phone number can contain up to 16 digits, which are commonly sent in an American Standard Code for Information exchange "ASCII" format.

Row 464 provides the caller's number in an alternate stator format, which is known to exist in Canada. This alternate format is represented by a parameter-type value of "03". Row 466 shows that a parameter-type value of "04" is associated with a reason for an absence of a caller's number in the caller identification information. In some instances, the number of the person calling is not provided in the caller identification information because the caller is making a call out of an area from which caller identification numbers can be provided or because the caller has "blocked" their caller identification information. If the caller is out of the caller identification area, an "o" is provided as the parameter data. If the caller has blocked their caller identification information, a "P" is provided to signify that the caller number is private.

In row 468 of FIG. 6, the parameter-type value "05" is associated with the caller's name and can have up to fifteen characters. In row 470, a parameter-type value of "06" is associated with a reason from an absence of a caller's name in the caller identification information. This parameter can have values of "O" for out of area and "P" for private or blocked caller information.

FIG. 7 provides a data structure for the caller identification information that is packaged within a caller identification packet sent to personal computer 20 such as data packet 420 of FIG. 5. The data structure of FIG. 7 is divided into five portions that are placed in bytes 424 through 440 of the five respective data packets 420 that together transmit the caller identification information.

In data structure 500 of FIG. 7, a message type 502 is found in the most significant byte position. Message type 502 designates this as a multiple data message rather than a single data message, described further below. After message type 502, data structure 500 includes a message portion 504 and a checksum byte 506. Checksum byte 506 indicates whether the received CID information contained errors.

Within message portion 504, the caller identification information is divided into sections with each section containing one type of parameter data headed by the parameter-type value associated with the section and the number of bytes in the section. For example, parameter bytes 507 are headed by parameter length byte 508, which describes the number of bytes in parameter bytes 507, and parameter-type byte 510, which provides the parameter-type value associated with parameter bytes 507. For example, for a parameter-type value of "01", which is associated with the date and time of the call, the parameter length byte will have a value of "04" hexadecimal and the parameter bytes will be four bytes long and will contain the month, day, hour and minute of the call.

For caller identification information provided in single data message format by the central office, an embodiment of the present invention provides an alternative format for the caller identification information found in packet 420 of FIG. 5. This alternative embodiment is shown as data structure 520 in FIG. 8.

Data Structure 520 includes a header byte 522 that designates the message type as a single data message. Header byte 522 is followed by a message length byte 524 that indicates the number of bytes in a message section 526 that follows message length byte 524. Message section 526 is divided into two sections, a caller number section 528 and a caller name section 530. Caller number section 528 either includes the phone number of the caller or a reason for an absence of the caller's phone number. Caller name section 530 either includes the caller's name or the reason for the absence of the caller's name. Message section 526 is followed by a checksum byte 532 that provides error checking for all of the data in data structure 520. As in the example for multiple data messages of FIG. 7, the data structure 520 of a single data message is divided among five different caller identification packets when it is sent to personal computer 20.

After sending the caller ID information to personal computer 20, base station 104 returns to its main processing loop 250.

Figure 9:
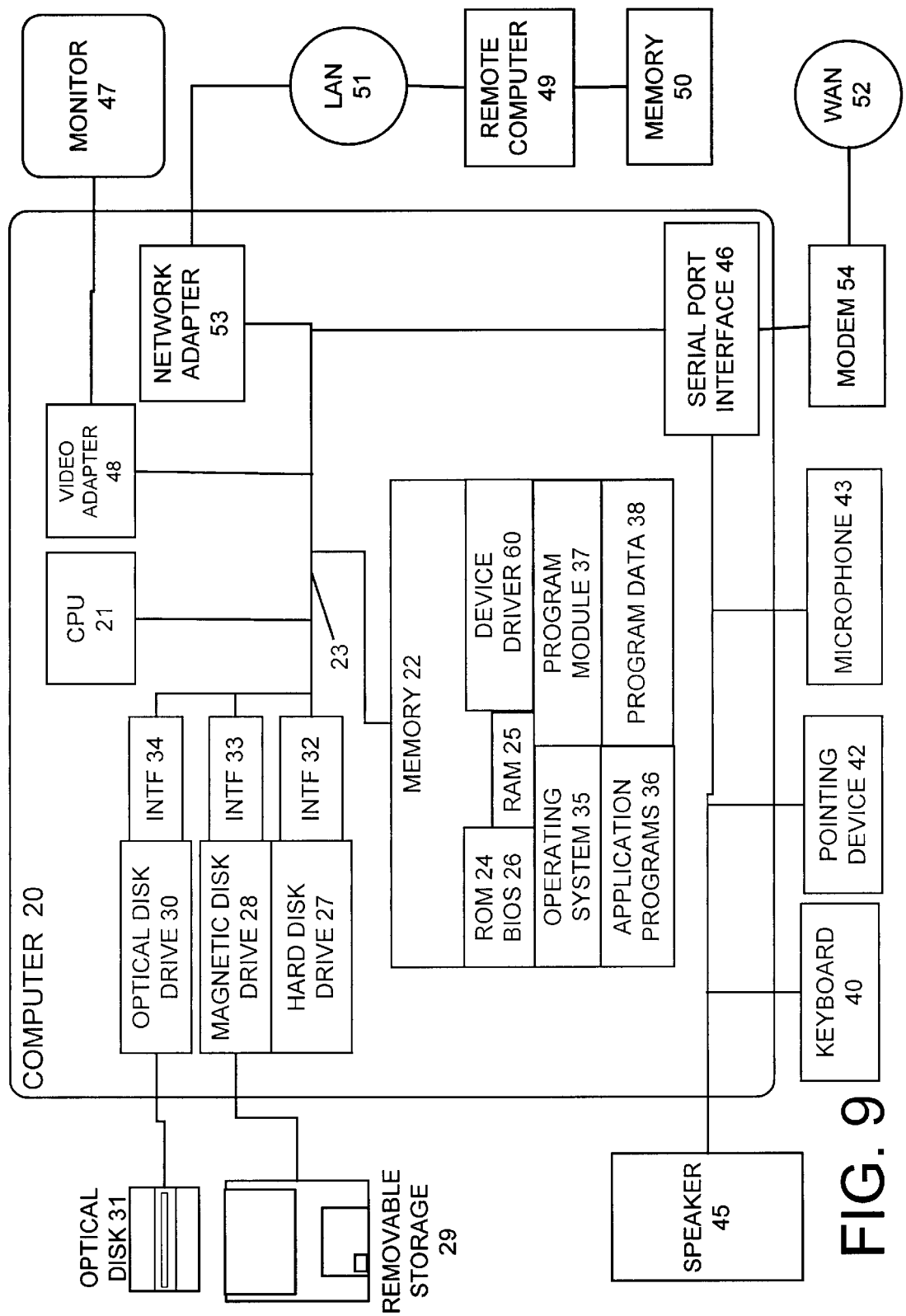
FIG. 9 is a block diagram of a general embodiment for the personal computer of FIG. 1.

FIG. 9 provides a general block diagram of computer 20 of FIG. 1. FIG. 9 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 9, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs) read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input device 47 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 9. The logic connections depicted in FIG. 9 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Figure 10:
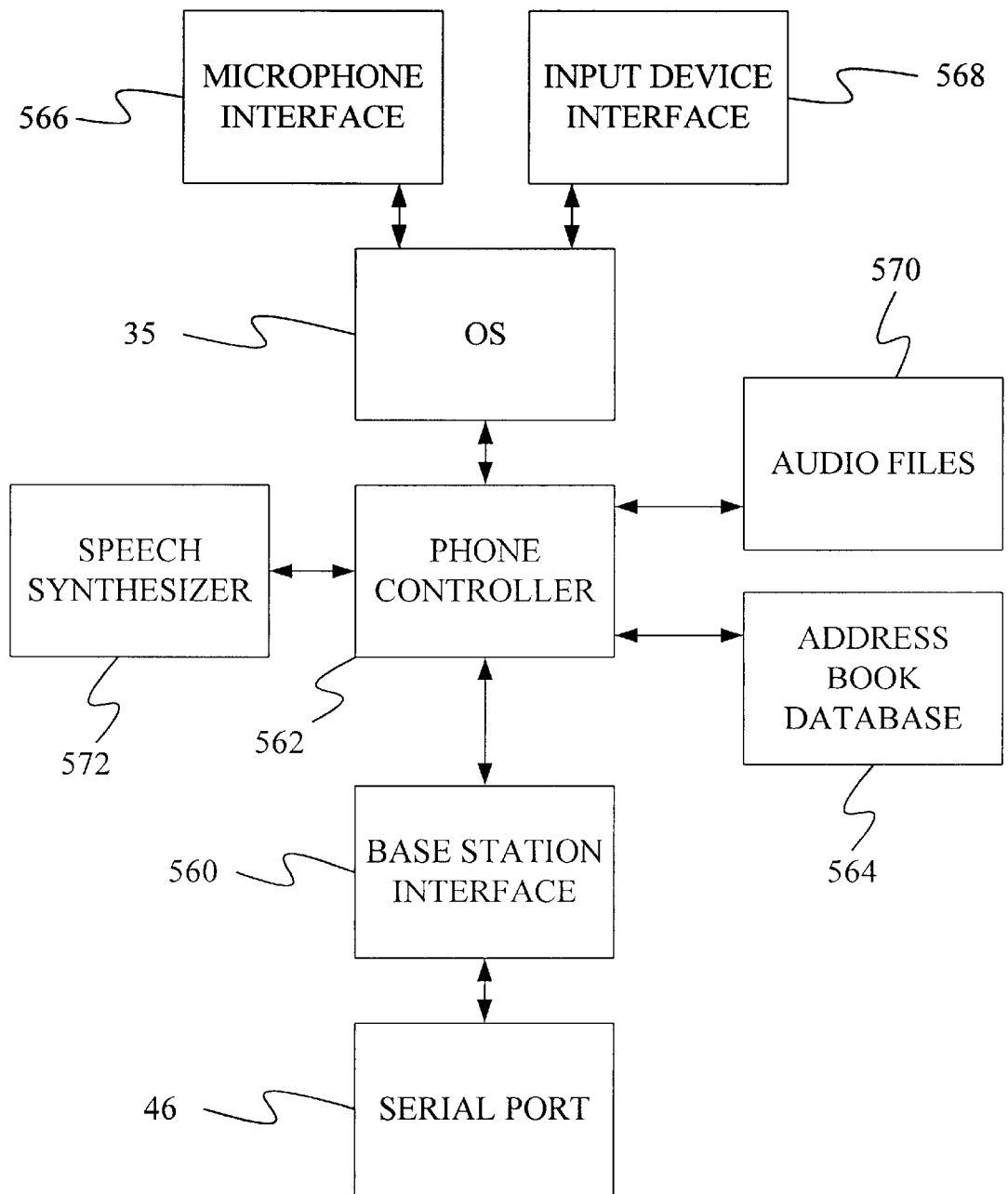
FIG. 10 is a more detailed block diagram of the personal computer of FIG. 9 showing those elements that are specifically germane to the present invention.

FIG. 10 provides a more selective and detailed block diagram of personal computer 20 showing those elements that are specifically germane to the present invention. The caller identification packets produced by microcontroller 114 in step 270 of FIG. 2 are passed serially to a serial port 46 that converts the serial information into parallel digital values. The parallel digital values are provided to a base station interface 560, which strips out the caller identification information from the caller identification packet and rejoins the caller identification information into the original data structure, such as data structure 500 of FIG. 7 or data structure 520 of FIG. 8. The caller identification data structure, is then passed from base station interface 560 to a phone controller 562.

Phone controller 562 accesses the caller number and caller name in the caller identification information. Using the caller number and caller name, phone controller 562 accesses an address database 564 to determine if an audio file has been stored for either the caller number or the caller name. Such audio files can be stored using a microphone such as microphone 43 of FIG. 9, which interacts with personal computer 20 through a microphone interface 566. The microphone data provided by microphone interface 566 is passed to operating system 35, which routes the microphone input to phone controller 562. Phone controller 562 then stores the microphone data in one or more audio files 570. In FIG. 10, operating system 35 also interacts with other input devices through input device interface 568. Thus, input device events related to the phone system are routed through input device interface 568 and operating system 35 to phone controller 562.

After personal computer 20 receives the caller identification information from microcontroller 114, it performs a number of announcement steps shown in dotted box 271 of FIG. 2. In step 272, phone controller 562 of FIG. 10 determines if a caller identification announcement feature is enabled for the phone system. If the caller identification announcement feature is not enabled at step 272, the user does not want an announcement to be made and personal computer 20 takes no further steps to produce an announcement but instead exits the announcement procedure at step 287.

If the caller identification announcement feature is enabled at step 272, phone controller 562 searches address data base 564 for a pointer to an audio file that has been stored either for the caller's number or the caller's name. This search is performed at step 274 for FIG. 2.

If phone controller 562 locates a pointer to such an audio file, it retrieves the audio file from the set of stored audio file 570 at step 276. If phone controller 562 cannot locate a pointer to an audio file at step 274, phone controller 562 passes the caller's name and or the caller's phone number to a speech synthesizer 572. Speech synthesizer 572 then synthesizes audio data to represent the caller's name and/or number at step 278 of FIG. 2. Speech synthesizer 572 can include any number of known speech synthesis components including stored phonemes that describe basic units of speech, prosody generators that generate the pitch and timing associated with human speech, and filters designed to improve the output quality of the speech. In this context, phone controller 562 and/or speech synthesizer 572 are considered audio message generators.

After phone controller 562 has retrieved the audio file or after speech synthesizer 572 has generated audio data based on the caller's name, phone controller 562 disables ringing at the base station at step 280 of FIG. 2. To disable ringing at the handset, phone controller 562 instructs base station interface controller 560 to send a disable ring data packet such as data packet 800 of FIG. 11.

As shown in the embodiment of FIG. 11, packet 800 has fourteen bytes. Byte 802 identifies the packet as containing command data rather than audio data. Byte 804 identifies the packet as containing at least one system settings byte for the phone system. Byte 806 contains a set of bit flags for various settings of the phone system. In one embodiment, the least significant bit of byte 806 indicates whether ring tone generation is to be enabled at the handset. If the bit has a value of "1", ring tone generation is enabled. If the bit has a value of "0", ring tone generation is disabled. Bytes 808 and 810 are the last two bytes of the data packet and contain error-checking values. The remaining bytes are reserved for other uses under the embodiment of FIG. 11. Those skilled in the art will recognize that the reserved bytes may be modified to contain other system settings.

Upon receiving data packet 800 of FIG. 11, microcontroller 114 passes the ring tone disable value to microcontroller 116, which updates a ring enable value stored within a buffer associated with microcontroller 116 so that ring tone generation is no longer enabled in base station 104. This prevents base station 104 from sending further ring generation values to handset 110. By eliminating the possibility that base station 104 will send ring tone values to handset 110, the present invention eliminates interference between the ring tone signal and the audio announce signal.

Once ring tone generation has been disabled, phone controller 562 requests a communication path between phone controller 562 and handset 110. In one embodiment, this request is in the form of a data packet sent to microcontroller 114. Based on this data packet, microcontroller 114 causes microcontroller 116 to change switching network 118 to provide a communication path from personal computer 20 through digital signal processor 126, CODEC 124, switching network 118, RF module 128 to handset 110.

Figure 12:
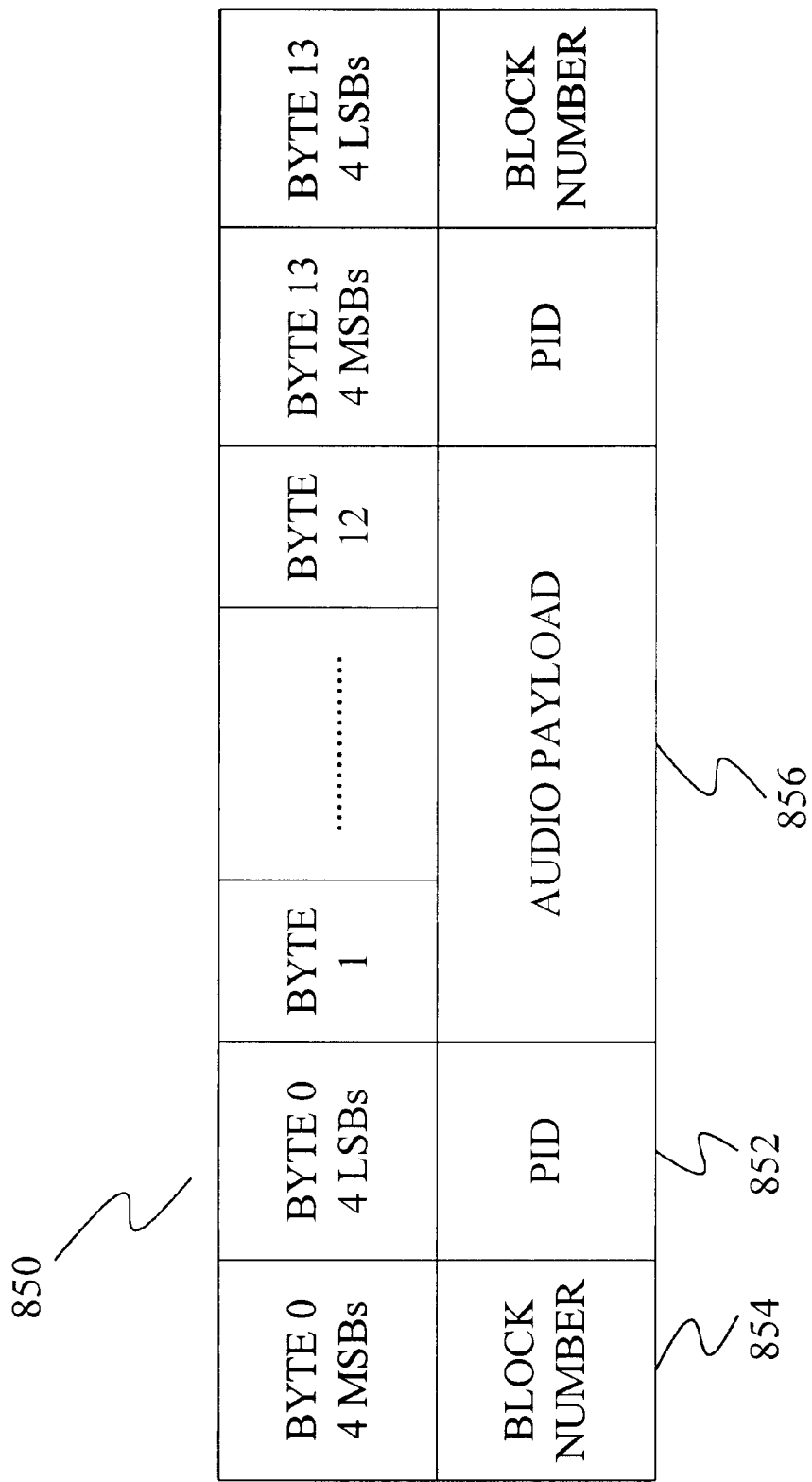
FIG. 12 is a data structure for an audio packet passed from the personal computer to the base station under the present invention.

Once the communication path has been established between personal computer 20 and handset 110 at step 282, personal computer 20 transmits the announcement audio data to microcontroller 114 using an audio data packet 850 of FIG. 12. Audio data packet 850 includes a header byte that is divided into a block number nibble 854 and an audio packet identifier nibble 852. Block number nibble 854 is used to identify the order of individual audio packets that together form a complete audio signal. Audio packet identifier nibble 852 identifies this packet as containing audio data instead of command data.

After audio packet identifier nibble 852, audio data packet 850 includes twelve bytes of audio data, which are denoted as audio payload 856. In one embodiment, an 8 bit encoding format is used to encode the audio data where the most significant bit is a polarity bit, the next three bits represents a segment code and the four remaining bits represent a quantization code.

The last byte of audio packet 850 is the same as the first byte., except that the position of the nibbles has been reversed.

The audio data in audio payload 856 is removed by microcontroller 114 and is sent to digital signal processor 126. The encoded audio data is then transmitted to CODEC 124, which converts the encoded digital audio data into an analog audio signal that passes through switching network 118 to RF module 128. RF module 128 then sends the analog signal to handset 110, which applies the analog signal to its speaker to generate the audio announcement.

Figure 13:
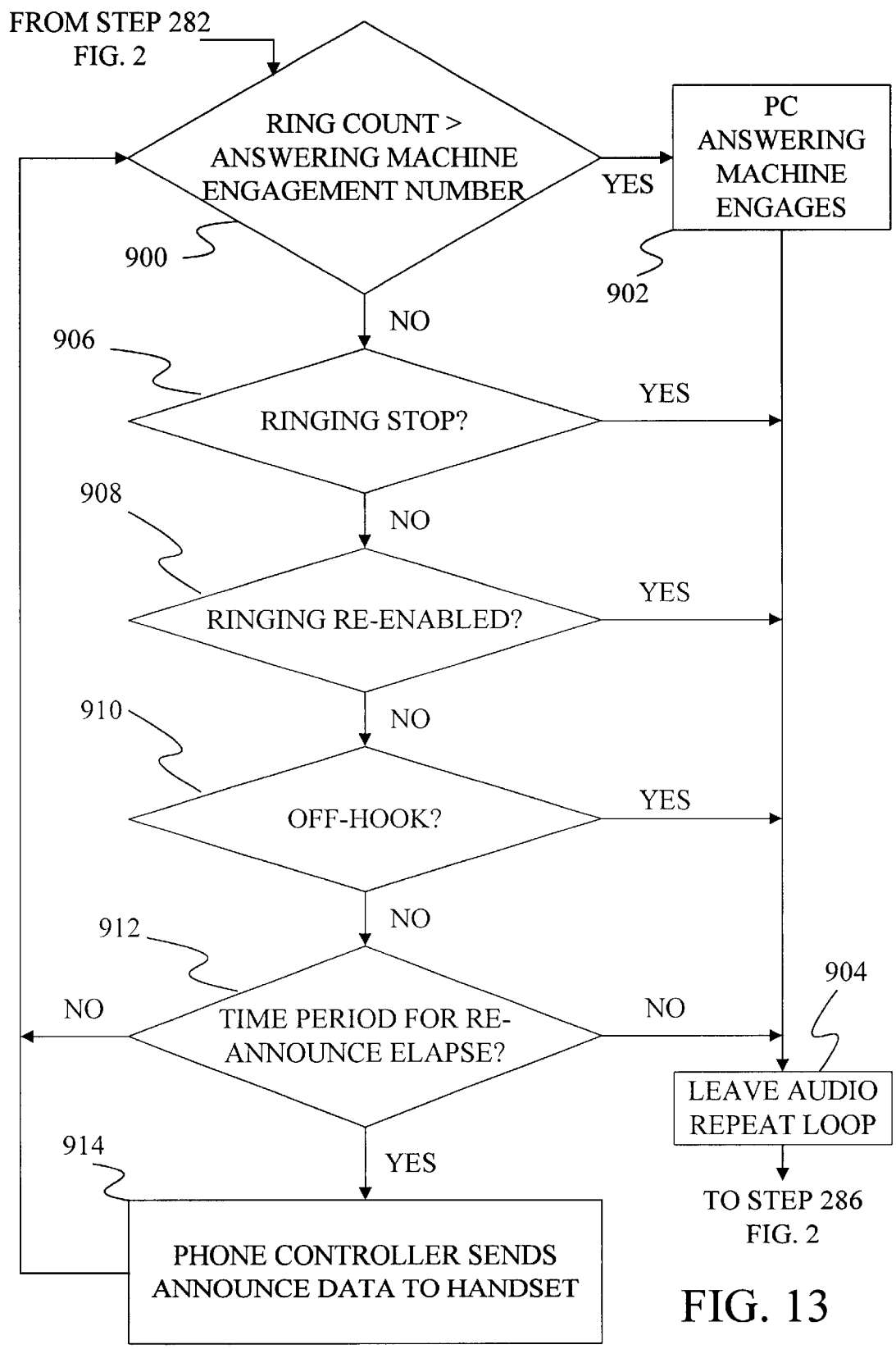
FIG. 13 is a flow diagram of an audio loop of FIG. 2.

The phone system of the present invention continues to repeat the audio announcement using an audio repeat loop 284 of FIG. 2, which is shown in more detail in the flow diagram of FIG. 13. In FIG. 13, personal computer 20 determines at step 900 if the number of ring envelopes received on telephone lines 100 and 102 exceeds the number necessary to engage answering machine functions provided by personal computer 20. If the number of ring envelopes exceeds the answering machine pick-up number at step 900, personal computer 20 requests a connection to the telephone line and engages its answering machine functions at step 902. The engagement of the answering machine functions causes the phone system to leave the audio repeat loop at step 904 and continue functioning at step 286 of FIG. 2.

If the ring count has not exceeded the number of rings necessary for the personal computer 20 to engage its answering machine functions, microcontroller 114 determines whether ringing has stopped by measuring the amount of time since the last ring envelope at step 906. If ringing has stopped at step 906, the phone system leaves the audio repeat loop at step 904. If ringing has not stopped at step 906, microcontroller 114 determines whether ringing has been re-enabled at step 908. If ringing has been re-enabled, the phone system leaves the audio repeat loop at step 904. If ringing has not been re-enabled at step 908, microcontroller 114 determines if the user has answered the phone by taking the handset 110 off hook or by taking one of the extension phones off hook at step 910. If the user has answered the phone at step 910, the phone system leaves the audio repeat loop at step 904. If the user has not answered the phone at step 910, microcontroller 114 determines if a silence period between announcements has elapsed at a step 912. This time period allows for a period of silence between announcements to provide a more acceptable user interface. If the silence period has not elapsed at step 912, control returns to step 900. If the silence period has elapsed at step 912, control continues at step 914 where phone controller 562 resends the announcement to the handset. Control then returns to step 900.

After leaving audio repeat loop 284, personal computer 20 re-enables ringing at base station 104 at a step 286. In one embodiment, this is accomplished using the data packet of FIG. 11 with the ringing parameter set to enable ringing in the base. By re-enabling ringing after the user or the answering machine has answered the phone call or after the caller has ended the call before it was answered, the present invention insures that the user will at least receive an audio ring tone signal for the next incoming call even if personal computer 20 is disconnected from base station 104.

In other embodiments, base station 104 automatically re-enables ringing when it loses contact with personal computer 20.

After re-enabling ringing at step 286, personal computer 20 exits the announcement procedure at step 287.

Although the present invention has been described with reference to personal computer 20, those skilled in the art will recognize that the functionality present in personal computer 20 can be achieved in base station 104 by adding appropriate components to base station 104. In addition to a remote (wireless) handset or a handset attached to base station 104, the present invention can include any audio output device which can be used to announce a caller, such as a speaker integrated into base station 104, a speakerphone integrated into base station 104, the speakers of a PC, and a home-networked TV of the future which can announce a telephone call.

Although the present invention has been described with reference to particular embodiments, workers skilled in the art will recognize that changes may be made in form and detail without departing from the spirit and scope of the invention.

What is claimed is:

1. A method of providing caller identification information to a user of a phone system, the method comprising:

receiving a caller identification packet from a central office along a phone line;

decoding the caller identification packet to produce caller identification information;

identifying an audio message based on the caller identification information;

disabling ring tone generation in at least one location of the phone system by issuing a command from a computer to a base station;

emitting the audio message by passing the audio message through the base station; and re-enabling ring tone generation in at least one location of the phone system where ring tone generation was disabled, wherein the ring tone generation is re-enabled upon the termination of a connection between the computer and the base station.

2. The method of claim 1 wherein disabling ring tone generation comprises preventing a base station from sending a ring value to a remote handset.

3. The method of claim 1 wherein disabling ring tone generation comprises preventing a base station from sending a ring value to a handset.

4. The method of claim 1 wherein emitting the audio message comprises emitting the audio message from a remote handset.

5. The method of claim 1 wherein identifying an audio message based on the caller identification information comprises synthesizing speech data based on the caller identification information.

* * * * *